US010785855B2

(12) United States Patent
Feil et al.

(10) Patent No.: US 10,785,855 B2
(45) Date of Patent: Sep. 22, 2020

(54) LIGHTING DEVICE FOR COMMUNICATING WITH A MOBILE TERMINAL

(71) Applicants:Osram GmbH, Munich (DE); Osram Sylvania Inc., Wilmington, MA (US)

(72) Inventors: Henry Feil, Unterhaching (DE); Barry Stout, Beverly, MA (US)

(73) Assignees: OSRAM GMBH, Munich (DE); OSRAM SYLVANIA INC., Wilmington, MA (US)

( * ) Notice: Subject to any disclaimer, the term of this patent is extended or adjusted under 35 U.S.C. 154(b) by 103 days.

(21) Appl. No.: 15/775,422

(22) PCT Filed: Nov. 3, 2016

(86) PCT No.: PCT/EP2016/076520
§ 371 (c)(1),
(2) Date: May 11, 2018

(87) PCT Pub. No.: WO2017/080900
PCT Pub. Date: May 18, 2017

(65) Prior Publication Data
US 2018/0332692 A1    Nov. 15, 2018

(30) Foreign Application Priority Data
Nov. 13, 2015    (DE) .................... 10 2015 222 417

(51) Int. Cl.
*H04L 9/32*      (2006.01)
*H05B 47/19*     (2020.01)
(Continued)

(52) U.S. Cl.
CPC ........... *H05B 47/19* (2020.01); *H04B 10/116* (2013.01); *H04L 9/08* (2013.01); *H04L 63/0428* (2013.01);
(Continued)

(58) Field of Classification Search
None
See application file for complete search history.

(56) References Cited

U.S. PATENT DOCUMENTS

2002/0197963 A1    12/2002   Angermann et al.
2007/0248232 A1*   10/2007   Driscoll ................ H04L 9/0822
                                                              380/280
(Continued)

FOREIGN PATENT DOCUMENTS

DE     102011104364 A1    12/2012
DE     102011080876 A1     2/2013
(Continued)

OTHER PUBLICATIONS

Chapman; "Hacking into Internet Connected Light Bulbs"; URL: http://www.contextis.com/resources/blog/hacking-internet-connected-light-bulbs/; contextis; retrieved on Oct. 30, 2015.
(Continued)

*Primary Examiner* — Brandon S Hoffman
(74) *Attorney, Agent, or Firm* — Viering, Jentschura & Partner MBB

(57) ABSTRACT

A lighting device for communication with a mobile terminal, comprising: a lighting means, and an electronic operating device for operating the lighting means, a data storage unit, in which a first key is stored in a memory area reserved therefor, an encryption unit configured to read out the first key from the reserved memory area and, in accordance with a specifiable encryption operation, to convert measurement value data and/or identification data intended for transfer to the mobile terminal into a message encrypted by means of the first key, and a transmitting unit configured to transmit the encrypted message to the mobile terminal.

17 Claims, 11 Drawing Sheets

(51) Int. Cl.
*H04W 4/70* (2018.01)
*H04L 29/06* (2006.01)
*H04W 12/02* (2009.01)
*H04B 10/116* (2013.01)
*H04L 9/08* (2006.01)
*H04W 12/04* (2009.01)
*H04W 12/06* (2009.01)

(52) U.S. Cl.
CPC ............. *H04W 4/70* (2018.02); *H04W 12/02* (2013.01); *H04W 12/04* (2013.01); *H04W 12/06* (2013.01)

(56) References Cited

U.S. PATENT DOCUMENTS

| | | | |
|---|---|---|---|
| 2008/0320190 A1* | 12/2008 | Lydon | G06F 13/387 710/106 |
| 2014/0053281 A1 | 2/2014 | Benoit et al. | |
| 2014/0258724 A1 | 9/2014 | Lambert et al. | |
| 2015/0263861 A1 | 9/2015 | Kumar et al. | |
| 2016/0085955 A1* | 3/2016 | Lerner | G06F 21/31 726/20 |

FOREIGN PATENT DOCUMENTS

| | | |
|---|---|---|
| DE | 102011016106 A1 | 6/2013 |
| EP | 1263150 B1 | 5/2004 |
| WO | 2013023968 A1 | 2/2013 |
| WO | 2015148696 A1 | 10/2015 |

OTHER PUBLICATIONS

Zillner; "Zigbee Exploited"; URL:https://www.blackhat.com/docs/us-15/materials/us-15-Zillner-ZigBee-Exploited-The-Good-The-Bad-And-The-Ugly-wp.pdf; Cognosec; retrieved on Jan. 25, 2017.

Dhanjani; "Hacking Lightbulbs: Security Evaluation of the Philips hue Personal Wireless Lightning System"; URL:http://www.dhanjani.com/docs/Hacking%20 Lighbulbs%20Hue%20Dhanjani%202013.pdf; retrieved on Jan. 25, 2017.

Barcena et al.; "Insecurity in the Internet of Things", Symantec; URL:https://www.symantec.com/content/en/us/enterprise/fact_sheets/b-in security-in-the-internet-of-things-ds.pdf; retrieved on Jan. 25, 2017.

German Search Report based on application No. 102015222417.1 dated Aug. 3, 2016 (9 pages) (Reference Purpose Only).

International Search Report based on application No. PCT/EP2016/076520 dated Feb. 3, 2017 (6 pages and 3 pages of translation) (Reference Purpose Only).

* cited by examiner

LIGHTING DEVICE FOR COMMUNICATING WITH A MOBILE TERMINAL

CROSS-REFERENCE TO RELATED APPLICATION

The present application is a national stage entry according to 35 U.S.C. § 371 of PCT application No.: PCT/EP2016/076520 filed on Nov. 3, 2016, which claims priority from German Patent Application Serial No. 10 2015 222 417.1 which was filed on Nov. 13, 2015, and is incorporated herein by reference in its entirety and for all purposes.

TECHNICAL FIELD

The description relates to a lighting device for communicating with a mobile terminal. The description further relates to a lighting system having such a lighting device. Furthermore, the invention relates to a method for operating a lighting device.

BACKGROUND

An embodiment of a lighting device which communicates with a mobile terminal is found, for example, in WO 2015/148696 A1. This shows techniques for location-based actions by means of light-based communication. Moreover, EP 1 263 150 B1 discloses a data transmission system having a local beacon, which, on the one hand is in communication with controlling and/or information transmitting infrastructure facilities, such as a central services server or the internet, and/or with one or more other local beacons, and on the other hand contains a combined transmitting/receiving device, or in special cases only a pure transmitting device, for providing a wireless communication connection to one or more terminals within its vicinity and which is arranged in, on or on the site of an electrical lighting device. The local beacon is equipped with an intelligently operated storage and/or processing functionality relating to the data to be wirelessly transmitted, wherein the storage functionality of the local beacon consists of providing information so that this information may then be sent repeatedly to users equipped with a suitable terminal without having to be collected each time by the infrastructure facilities, and that the processing functionality consists of the fact that specific processing operations, which would otherwise be performed in a central processing unit of the infrastructure facilities or in the terminal itself, are outsourced to the local beacon.

The communication channels known from the prior art, in particular the communications channel using a light emitted by a lamp, may be used by third parties for providing their own services.

SUMMARY

A non-limiting object of the present description is to provide a lighting device, a lighting system and a method by means of which a more secure transfer of data from the lighting device to a mobile terminal may be ensured.

The description is based on a lighting device for communication with a mobile terminal, including a lighting means and an electronic operating unit for operating the lighting means. The lighting device may include, in addition to a component operating using optical technology in the form of a lamp, additional components that are arranged outside the lamp itself. The lighting means may be formed by an LED lighting means or by a low-pressure discharge lamp (fluorescent lamp). The electronic operating unit may include a program-controlled computing unit, for example in the form of a microprocessor or a microcontroller.

The lighting device according to the description is extended in such a way as to also include a data storage unit, in which a first key is stored in a memory area reserved therefor, an encryption unit, which is designed to read out the first key from the reserved memory area and, in accordance with a specifiable encryption operation, to convert measurement value data and/or identification data intended for transfer to the mobile terminal into a message encrypted by means of the first key, and a transmitting unit, which is designed to transmit the encrypted message to the mobile terminal. The encryption unit is advantageously implemented on a program-controlled computing unit. The encryption operation is given by a mathematical calculation rule for generating an encrypted secret text from an unencrypted item of plain text, in which the plain text is mapped onto the secret text. The resulting mapping function depends on the first key, which is used for the encryption operation.

Dynamic measurement data and/or static identification data that are emitted by a lighting device may be read and used by any given users. The data, in particular the identification data, may be read by a third party and entered into their own maps, such that a link is created between identification data and, for example, the position. Thus, services may be developed by third parties without setting up their own separate lighting system including individual lighting devices with appropriate information and transmission sources, or without incurring the costs for the particular infrastructure. This service is therefore no longer exclusive to the party that finances the infrastructure, i.e. the lighting devices and/or the lighting system. Therefore, in accordance with the description, it is provided that the transmission of the measurement data and/or identification data is not static and open, but is carried out in encrypted form. This may be used to prevent a third-party vendor from using the existing infrastructure for themselves to develop the expenditure for the development of their own infrastructure, which they need to provide their own service.

The storage of one or more first keys, which are designed for later local use in connection with the installation location of the respective lighting device when installed in a lighting system, may be performed already at the production stage of the lighting device.

The storage of one or more first keys may be performed together with a programming of the identification data, for example a luminaire ID. On the basis of the luminaire ID, the key assignment may also be performed along with the initial installation and localization of a lighting device at a particular location.

In accordance with an advantageous extension, the lighting device may have an interface which is designed to access the reserved memory area in a write mode. In this way, including retrospectively, that is to say after the production of the lighting device, either additional or first alternative keys may be installed which supplement or replace the existing key set. New keys may therefore be installed into the lighting device, in particular during the operation. For this purpose, the installation may take place manually via a wired or wireless interface. In a particular way, an existing network with lighting control is suitable for this purpose, since only a small data volume must be transferred for installing a new key. Another advantageous aspect of using an existing network for lighting control is that this is not a publicly accessible network.

In accordance with an advantageous extension the interface is part of the electronic operating unit, wherein the electronic operating unit is designed, in a normal operating mode of the lighting device, to operate the lighting means as a function of a control signal supplied at the interface. The interface may be designed as a wired interface, in particular as a two-wire interface. The interface may be a DALI interface or a Powerline interface. An I2C interface or a USB interface may also be provided. Alternatively, the interface may be designed as a wireless interface, in particular as a radio interface. The interface may be designed as a WLAN interface or Bluetooth interface, or as a ZigBee interface. It may also be provided that the wireless interface is designed as an infrared interface.

Radio-based transmitting and receiving units that are coupled with the lighting device may be used for installing the keys. Suitable options here are beacons, which are coupled with the lighting device, in particular with the operating unit of the lighting device. These may also be used as receivers for data and are, therefore, suitable as a data path for the key distribution. The receivers may set up a wireless network (mesh) between themselves, wherein it may be sufficient to install the keys jointly at an access point, in particular at a single access point. Such an access point may be implemented, for example, by a gateway, which has a data transfer coupling of the wireless network to an existing network, for example, a public network. It may be provided that the keys are transmitted from a server to the local gateway. It may also be provided that the keys are transmitted from a mobile terminal to the gateway.

According to a further advantageous non-limiting embodiment, the lighting device has a transmitting/receiving unit, in particular a radio beacon, wherein the transmitting/receiving unit is designed to access the reserved memory area in write mode. If a light-based communication is used for communication with the mobile terminal, the transmitting/receiving unit may, in this case, be particularly advantageously used to provide a return channel, by means of which the mobile terminal may send data back to the lighting device. The advantage of such a separation of forward channel and reverse channel over two different physical channels thus offers increased protection against a possible unauthorized access to the data being sent.

According to an advantageous extension the transmitting unit is formed by the transmitting/receiving unit, wherein the data storage unit and the encryption unit are implemented on components of the transmitting/receiving unit. The transmitting/receiving unit may, therefore, be implemented by a beacon, which in addition to sending the message to the mobile terminal, also provides a feedback channel for the transmission of data to the lighting device.

The transmitting/receiving units also emit a static luminaire ID, which is not protected. In order to protect this luminaire ID from these transmitting/receiving units, the same method for key distribution may be applied. In this case, in an advantageous way, however, the key is not passed directly to the lamp, in other words to the electronic operating unit for operating the lighting means, but instead is stored directly within the transmitting/receiving units. The, data exchange between the lamp (the operating unit) and the transmitting/receiving unit is therefore unencrypted, and the data traffic between the transmitting/receiving unit and the mobile terminal is encrypted.

According to a further advantageous non-limiting embodiment the transmitting unit includes the lighting means, which is designed to transmit the message by means of a light-based communication, wherein the data storage unit and the encryption unit are implemented on components of the electronic operating unit. The light-based communication may cover the same solid angle as is defined in accordance with the primary purpose of the lighting device for the illumination with the lighting means, namely the achievement of a specifiable brightness in the respective effective range of the lighting device. In particular, it may be provided that the light-based communication takes place by means of light in the same wavelength range as the light emitted by the lighting means for the primary purpose of the illumination.

Communication via light in principle provides a very secure channel, because access to this channel only exists in the event of a direct line of sight to the light source. It thus represents a point-to-point connection and therefore offers a very secure channel which is largely protected against unauthorized external access.

According to a further advantageous non-limiting embodiment, the reserved memory area includes a plurality of first keys, wherein the encryption unit is designed to use one of the plurality of the first keys for the encryption operation, depending on a key activation signal that may be supplied to the lighting device. The key activation signal may be either supplied centrally from an external key server, or else controlled in accordance with a prescribed assignment rule depending on a clock and/or calendar function.

Alternatively, it may be provided that the lighting device itself selects the particular key to be activated. This may be performed cyclically, for example, by the keys being activated in the sequence in which they are stored in the reserved memory area. It may also be provided that a key is selected at random each time from the existing key set. The times at which each new key from the existing key set is activated may be arranged at constant specifiable time intervals. Alternatively, it may be provided that the respective activation time of a new key is randomly controlled.

A lighting system may include at least one lighting device according to the description, wherein the lighting system also includes a central key server which has a communication link to the at least one lighting device, which results in a lighting system according to the description. The central key server is advantageously available for the distribution and management of the keys that are allocated to the at least one lighting device.

In accordance with an advantageous extension, the key server is designed to transmit a key generation signal to the at least one lighting device via the communication link, wherein the at least one lighting device is designed to generate an individual local second key depending on the key generation signal received via the communication link. Particularly, it may be provided that the at least one lighting device is designed to apply a key previously used as the first key in the encryption operation to generate a new local key, so that a new key is generated on the lighting device based on this principle of key generation by providing a single generation key, which is transported via the key generation signal. In particular, if the lighting system includes a plurality of lighting devices, this may be used to ensure that by supplying a single central generation key to the individual lighting devices, an individual local key is generated in each respective lighting device. The previous first key in the lighting devices may thus be used as a so-called "Seat Key". If the key generation is triggered by the central key server, the key generation signal may be sent to all lighting devices. Ideally, this process is performed in times in which the lighting system is not in use, and/or when there is little or no data traffic, for example at night.

According to an advantageous extension the at least one lighting device is designed to start a timer with an individually specifiable expiration period at times when the individual local second key is generated, and after the expiry of the timer to register the second key on the key server via the communication connection, as a new first key used for the encryption operation. As a result, the volume of data that is produced in feeding back the new key is distributed over a wider time window, thus preventing a temporary overloading of the communication, which may be supplied in particular using a network for lighting control. Therefore, an individual time delay may be defined between the generation and activation of a new key. In order not to have to communicate to every lighting device an individual time delay between the signal for the new key generation and the sending of the new key to the key server, it may be provided that this time offset is programmed in during the manufacture of the lighting device. Alternatively, an individual luminaire ID or manufacturer number permanently defined for each lighting device may be used as a basis for calculating an individual time offset.

According to a further advantageous non-limiting embodiment the at least one lighting device is designed to create an individual local second key depending on a lighting-device internal timer. Instead of a centralized request for key generation therefore, a local individual randomly controlled key generation may be performed. This random control may be triggered via internal counters, which are started with random values. The time-base may be selected so that a key generation may be carried out within hours, days or weeks. As soon as a new key has been generated, it may be transmitted to the central key server. As long as the key server the key has not yet received and assigned the key, it is advantageous if the old key is temporarily retained, so that the data provision may be ensured without interruption. The old and new key are known on the key server and may therefore be supplied for a request both with regard to a message encrypted with the old key as well as with a message encrypted with the new key.

According to a further advantageous non-limiting embodiment the at least one lighting device includes a first and a second lighting device, wherein the central key server is designed to generate a first individual key and send it via the communication link in such a way that the first individual key is written into the memory area of the first lighting device reserved for the first key, and to generate a second individual key and send it via the communication link in such a way that the second individual key is written into the memory area of the second lighting device reserved for the first key (EKey), wherein the second individual key is different from the first individual key. In this case there is no central uniformly valid key for all lighting devices for the distribution of the keys, but an individual key for each lighting device. In this respect, there is a need to assign the keys individually. The correct key is sent to the intended lighting device. This may be effected via a routing table where all lighting devices are locally mapped. This routing table contains entries for the possible communication paths, via which a key may be moved to the correct position.

The communication link may be implemented via a light management system or a building management system. The interface to the respective light management system or building management system may be provided as a Dali interface, a ZigBee interface, WLAN interface, Bluetooth interface, KNX-interface, LON-interface or Ethernet interface.

According to a further advantageous non-limiting embodiment the at least one lighting device includes a plurality of lighting devices, in particular a first and a second lighting device, wherein the respective transmitting units of the plurality of lighting devices are designed as transmitting/receiving units for bi-directional communication, and wherein the plurality of lighting devices is designed to jointly operate a meshed network using the respective transmitting/receiving units, to allow communication of the individual lighting devices of the plurality of lighting devices among one another. In this way, the lighting devices may set up a wireless network (mesh) with one another, wherein the keys may be supplied at an access point in the form of a gateway.

The description also includes a method for operating a lighting device by communication with a mobile terminal. According to the description the method is further extended by the storage of a first key in a memory area of a data storage unit of the lighting device reserved, therefore, by reading out the first key from the reserved memory area, conversion of measurement data and/or identification data which are intended for transmission to the mobile terminal into a message encrypted with the first key in accordance with a definable encryption operation, and transmission of the encrypted message to the mobile terminal by means of a transmitting unit of the lighting device. The method is advantageously applicable to lighting devices, which do not have an accessible feedback channel during a normal intended operation of the lighting device. It may be particularly advantageously provided that the first key is already programmed into the data storage unit of the lighting device at the time of manufacture of the lighting device. In particular, it may be provided that the first key completes an intended use of the lighting device prior to its initial operation. It may be particularly provided that the storage of the first key is completed before the lighting device is assembled in a lighting system, i.e. the system installation. This may circumvent the problem that light for standard lighting has no direct feedback channel. In this respect, conventional methods which are based on the principle of bi-directional communication cannot be used.

According to an advantageous extension, the method includes the use of one of a plurality of first keys, which the reserved memory area includes, for the encryption operation depending on a key activation signal supplied to the lighting device. Such a key activation signal may be supplied, for example, from a central key server via a communication channel, for example, over a network for lighting control. The key activation signal may be implemented in such a way that it only contains a request to generate a new key. It may also be provided that the key activation signal already includes a key, in particular a generation key, which is designed to form the basis for the calculation of a new first key with an already existing first key on the lighting device in accordance with a specifiable generation rule. In this way, a plurality of single individual keys may be generated on different lighting devices within a lighting system with the transfer of a single uniform central generation key.

According to a further advantageous non-limiting embodiment, the method includes transmitting a key generation signal over a communication link to the lighting device by means of a key server, and generating a local individual key by means of the lighting device to be used for the encryption operation depending on the key generation signal received via the communication link.

The advantages and features and the embodiments described for the lighting device according to the description are equally applicable to corresponding methods and vice versa. Consequently, corresponding method features may be provided for device features, and vice versa.

The features and feature combinations cited in the description above, and the features and feature combinations cited in the description of the figures below and/or shown in the figures alone are applicable not only in the respective combination indicated but also in other combinations or in isolation, without departing from the scope of the invention. Therefore such embodiments are also to be considered as disclosed by the invention as are not explicitly shown or explained in the figures, but which emerge from and may be generated from the embodiments described by separate feature combinations.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DETAILED DESCRIPTION

Figure 1:
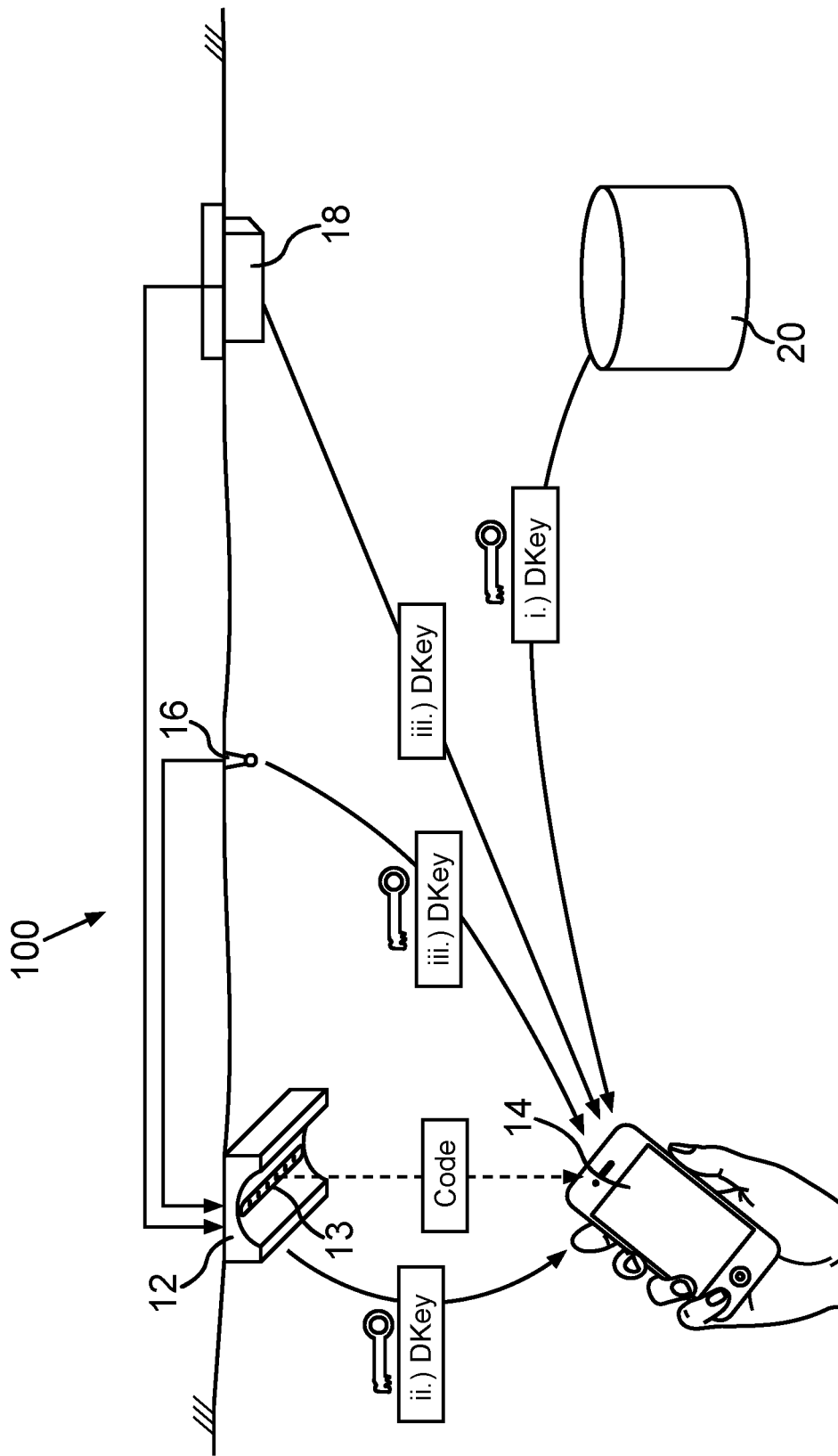
FIG. 1 a simplified schematic representation of a lighting system with a local client-based decryption, FIG. 2 a simplified schematic representation of a lighting system with an asymmetric encryption system, FIG. 3 a simplified schematic representation of a lighting system with a server-based decryption, FIG. 4 a simplified schematic representation of the application and transport of the keys according to a first embodiment of the invention for use in a lighting system, FIG. 5 a simplified schematic representation of an example key distribution over a wireless network set up using a beacon functionality, for key distribution according to a second embodiment of the invention for use in a lighting system, FIG. 6 a schematic representation of a simplified example of a symmetric encryption of a luminaire identification number and its decryption, FIG. 7 a simplified schematic representation of an example composition of an encrypted message, FIG. 8 a simplified schematic representation of the selection of a key for use in the invention, FIG. 9 a simplified schematic representation of an example meaning assignment of the signaling bit for rotation and direction of rotation of a key for use with the invention, FIG. 10 a simplified schematic representation of the generation of new keys by bitwise rotation of an existing key for use with the invention, and FIG. 11 a simplified schematic representation of the generation of a new key from two existing keys for use with the invention.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

A lighting system 100 includes at least one lamp 12, as a non-limiting example, in the form of a ceiling light. The lamp 12 includes a lighting means 13. The lighting system 100 also includes a mobile device 14.

The lighting system 100 may also have at least one of the following components, independently of one another and in any combination: a beacon 16, a WLAN router 18 and a server unit 20. A beacon 16, which is in direct data connection with the lamp 12, is also considered part of the lighting device in the same way as the lighting means 13 and an associated operating device (driver).

The lighting means 13 may be designed for light-based communication. This is suitable, as a non-limiting example, for navigation in the interior of buildings, so-called indoor navigation. Light-based indoor navigation is based on the emission of a light-ID (LID), which is received and may be detected by means of the mobile terminal 14. The light-ID is modulated onto the luminous flux, which is invisible to the human eye. In order to detect the signal with the mobile terminal 14, a line-of-sight connection must exist between the detector, for example a camera of the mobile terminal 14, and the lighting means 13, which represents the modulated light source. The light-ID is filtered out of the light again by the mobile device 14 and demodulated.

The description is based on the further recognition that transmitting units, which in order to provide a local emission of signals which contain location-specific measurement data and/or identification data in many cases have no feedback channel, as is the case with light-based communication via the lighting means 13, which means that encryption techniques based on bidirectional communication cannot be used.

The light-ID itself may either directly contain position information of the light source or else it may be determined indirectly via a look-up table. To this end the look-up table contains a mapping between light-ID and position information of the light source. In order to further increase the positional accuracy, an optical analysis may be carried out using an image sensor (camera). To this end, the different angles are determined, under which the image sensor receives the various light-IDs. From three different light-IDs, a unique position in space may thus be determined by triangulation. The location of the receiver itself, for example the camera, in the mobile device is determined in the receiver by means of sensors (3D acceleration sensors), to detect its own position and to compensate for any resulting position-dependent error in the position determination.

In addition to the position information, any other desired metadata, such as location-specific measurement data which is supplied by the lamp 12, may be linked to the light-ID. The look-up table may be stored as an integrated part in an application, which is running on the mobile terminal 14, or else stored on the external server unit 20, which the mobile terminal 14 accesses.

Conversely, the look-up table may also include dynamic information, such as which mobile terminal 14 has queried which position information. This allows a dynamic motion profile to be recorded (tracking) and saved with a time stamp (tracing). This motion information forms the basis for a wide range of location-based services and analyses.

There are various different wireless radio-based systems, such as WLAN or Bluetooth, which may be used for indoor position determination. In these systems, on the one hand the position of the transmitter (WLAN Access Point), shown in FIG. 1 as an optional WLAN router 18 or a beacon 16—in Bluetooth-based wireless systems, also referred to as a beacon—is known and on the basis of the signal strength of the received signal (Received Signal Strength, RSSI), the distance between the transmitter and mobile receiver may be estimated. For a unique position determination at least three different transmission sources are required (trilateration).

A complicating factor here is that the light-ID, which may be, for example an identification number of a lamp, always assumes a static value. The same applies to (transmitting) beacons 16, which for the sake of simplicity is described below using the example of a luminaire ID (used in the following synonymously with light-ID) and the associated encryption. If a fixed luminaire ID is encrypted with a fixed encryption key EKey, a fixed code sequence is again created, namely the encrypted message Code. This fixed code sequence may also be used as a pseudo-ID. Without knowing the actual underlying luminaire ID, it is possible to set up a pseudo-ID-based position determination system.

According to the description the light-ID is not now transmitted in the lighting system 100 in a static open form, but in encrypted form. A particular challenge is the fact that light for standard lighting has no direct feedback channel. In this respect, classical methods based on the principle of bi-directional communication cannot be used. FIG. 1 shows various ways in which a decryption key DKey for decrypting an encrypted message Code may be obtained, which is supplied via the lighting means 13 by means of a light-based communication.

In order to prevent unauthorized sharing, changing encryption keys EKey may be used. Thus, the signal that transports the encrypted message Code changes with each new encryption key EKey. If the encryption key EKey is changed once per week, as a non-limiting example, then it is not worthwhile for an unauthorized would-be user to keep converting their parasitic application to the new pseudo-IDs. For this purpose, a series of encryption keys EKey[1 ... m] may be made available in the lighting system 100, which are then used according to a pre-defined pattern. The currently active encryption key EKey[n] and the pattern must then be kept synchronized on the transmitting and receiving side.

When using symmetric cryptography techniques, the first key, in other words the encryption key EKey, and the second key, or the decryption key DKey, are identical.

In the following a dependency of the encryption key EKey on the location is denoted by EKey[loc], a dependency of the encryption key EKey on the time by EKey[temp], and a dependence on both the time and the location by EKey [temp,loc]. For example, EKey[n,loc] denotes a currently activated encryption key used for the encryption operation, belonging to the respective local lighting devices which together use the same key, i.e. in the extreme case, belonging to a single lighting device if all the lighting devices within the lighting system use their own keys. In the latter case, loc represents an index ranging from 1 to the number of individual lighting devices in the lighting system.

An encryption key EKey[n−1,loc] denotes a key which was active before the encryption key EKey[n,loc] and has been replaced by the latter. In the same way EKey[n+1,loc] denotes an encryption key that has not yet been activated, but which is intended to replace the current encryption key EKey[n,loc].

The same applies mutatis mutandis to decryption keys DKey, which—if not identical anyway when a symmetric encryption is used—are to be assigned such that they match the respective encryption key EKey.

For a client-side decryption, i.e. a decryption on the mobile terminal 14, the mobile terminal 14 requires the decryption key DKey to decrypt the encrypted message Code. The decryption key DKey may already be a part of the application which is executed on the mobile device, for example as a smartphone app.

Alternatively, the decryption key DKey may be supplied to the mobile device 14, or the application running thereon, during operation. The deployment of the decryption key DKey may take place i.) via an external server unit 20, wherein optionally either a locally valid decryption key DKey[loc] is assigned individually for each lamp 12, or a global decryption key DKey is supplied, which is equally valid for all lamps 12 within the lighting system 100, but possibly only for a limited period of time. In accordance with ii.) the decryption key DKey may be supplied using the lamp 12 itself. In addition or alternatively, in accordance with iii.) the decryption key DKey may be supplied via a local information source, for example via the beacon 16 or the WLAN router 18.

It may be provided that a locally supplied key also has only local validity. The decryption key DKey is only supplied after previous authentication of the mobile terminal 14 and for a limited time. The decryption key DKey is transmitted over secure connections, for example, Bluetooth or WLAN.

Figure 2:
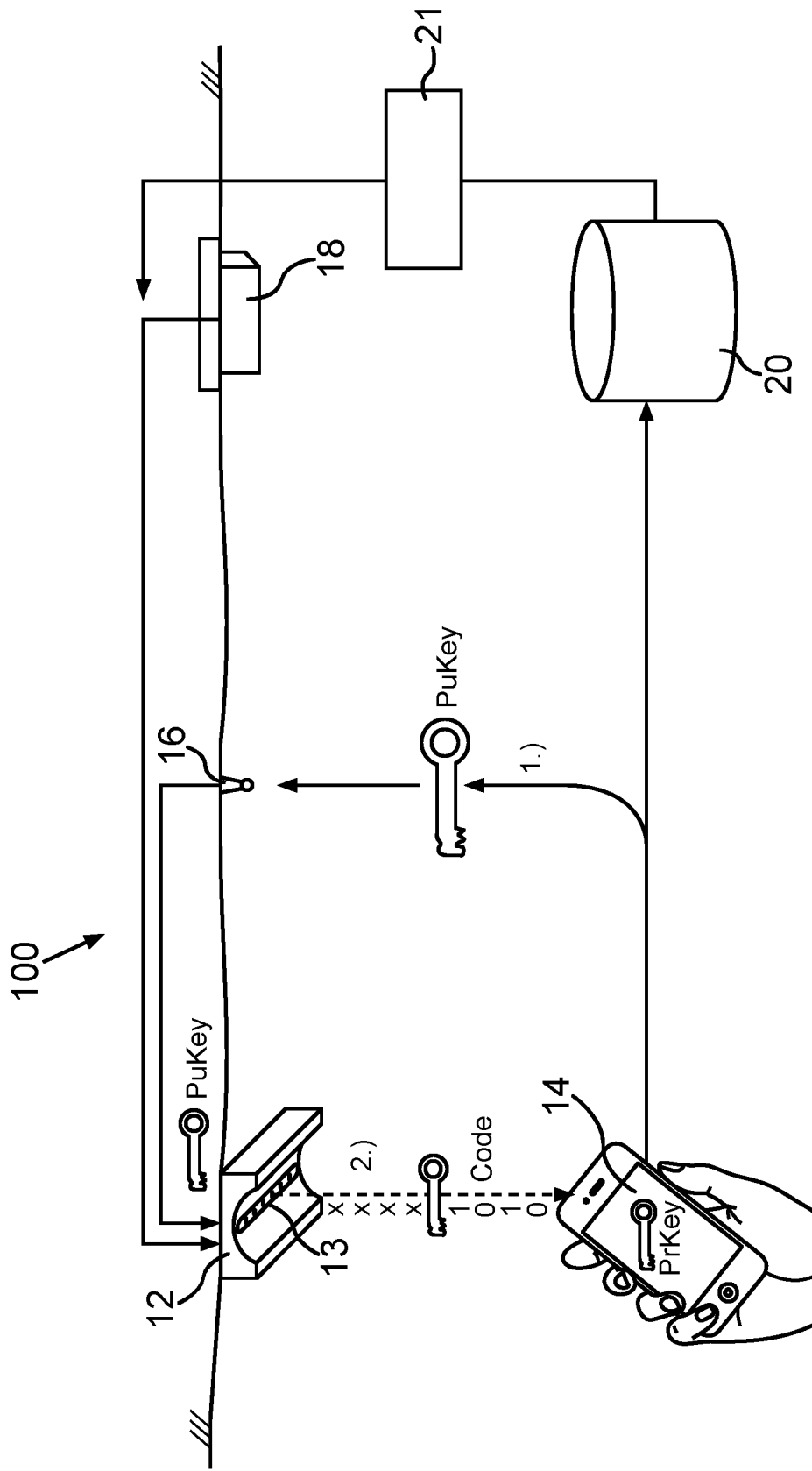

The encryption may also take place individually per mobile terminal 14 as shown in FIG. 2. For this purpose, the mobile terminal 14 generates a key pair consisting of a public key PuKey and a private key PrKey, wherein in a first step the public key PuKey is transmitted to the lamp 12. The public key PuKey may be transmitted to the lamp 12, for example, via the beacon 16, the WLAN router 18 or the server unit 20. The lamp 12 encrypts the identification data ID and sends it using the lighting means 13, so that only the mobile terminal 14, which owns the corresponding private key PrKey, may decrypt this identification data ID again.

A data connection between the server unit 20 and the lamp 12 is provided in accordance with the illustration in FIG. 2 using a light management system or building management system 21.

Figure 3:
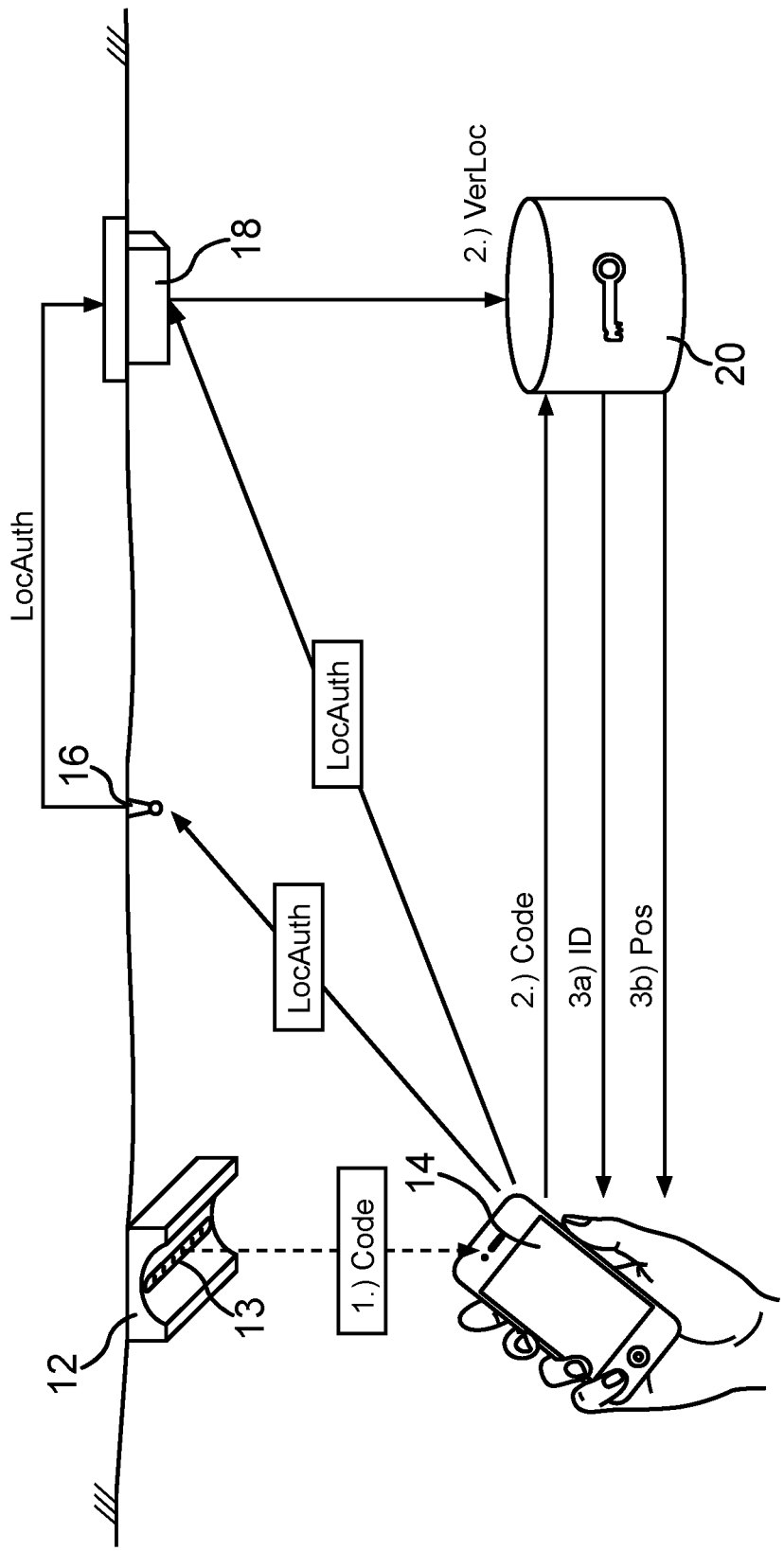

A server-side decryption and transmission back to the mobile terminal 14 is shown in FIG. 3. The encrypted message Code is transmitted to the server unit 20 and decrypted there. From there, the identification data ID obtained from the encrypted message Code are transmitted back to the mobile terminal 14. This has the advantage that the encryption may be changed arbitrarily and the decryption key DKey does not need to be transmitted to a large number of local terminals 14 or other similar clients, which therefore represents a more secure system. The identification data ID may be used locally for the activation of other services, such as a lighting controller.

In order to further increase the security level, a "local authentication" may be performed. Further local signals and information sources may be used to ensure that the requests to the server unit 20 with the local identification data ID actually do occur locally and the data are cannot be read by third parties, for example, by automated queries. For example, a local authentication LocAuth may be effected by a location verification VerLoc being performed in the server unit 20 via the beacon 16 or the WLAN router 18.

In the case of a server-side decryption of the encrypted message Code, position information Pos may also be transmitted directly back to the mobile terminal 14. To this end, the encrypted message code is transmitted to the server unit 20 where it is decrypted by means of the decryption key DKey. In addition, the conversion of the identification data ID into the position information Pos is also carried out there, wherein the position information Pos also represents any other data that may be uniquely assigned to the identification data ID. Therefore, the position POS data may be considered as representative of any other data that may be assigned to the lamp 12. The position data Pos (or other information that may be assigned to the lamp 12) is then transferred back to the mobile terminal 14. The advantage of this design is that on the side of the mobile terminal 14 no association may be established between the encrypted message Code and the unencrypted identification data ID, since only the encrypted message Code is known to the mobile terminal 14.

Figure 4:
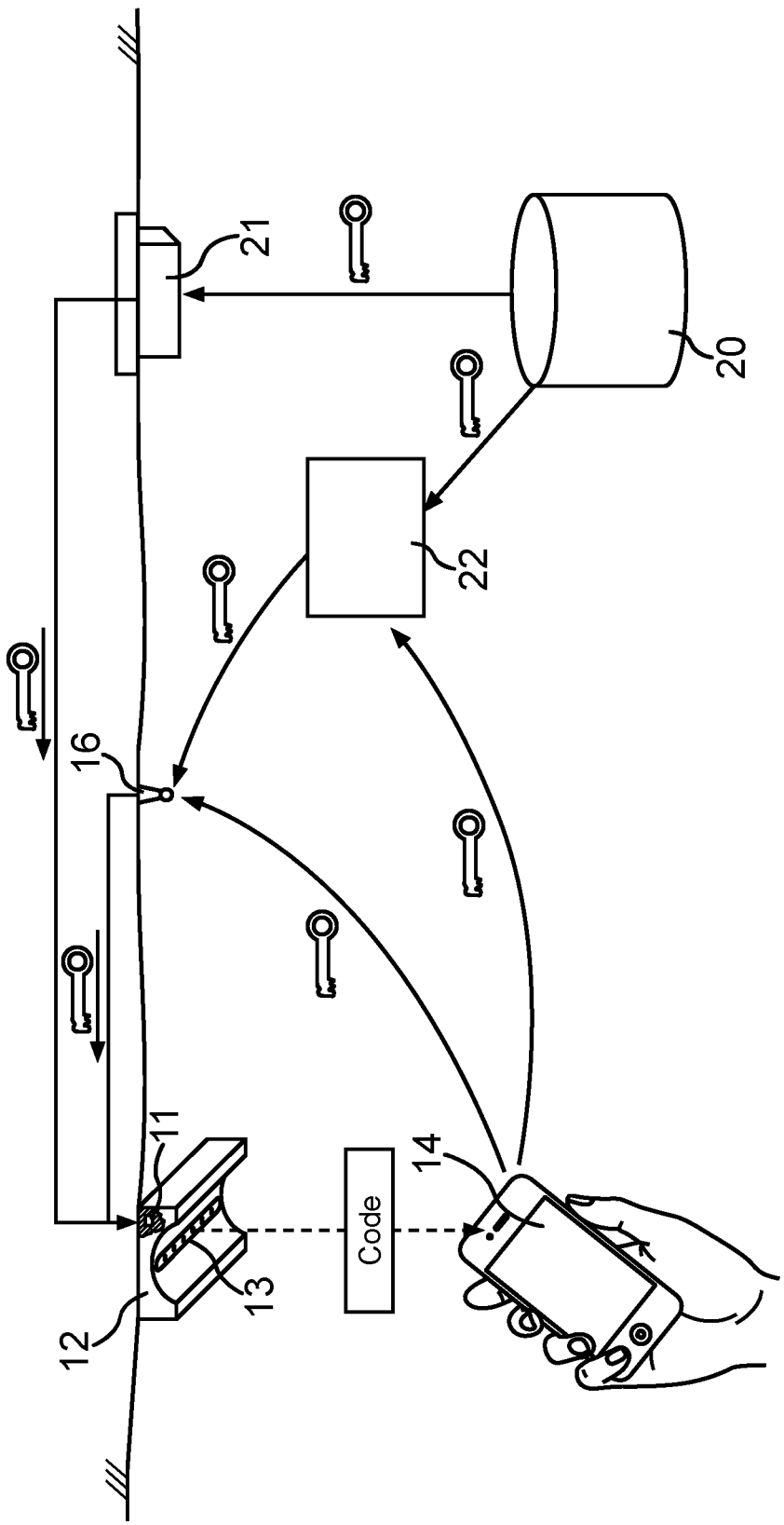

The transmission of an encryption key EKey into a lamp 12 is shown in FIG. 4. The transmission of the encryption key EKey may take place, for example, during the production of the respective lamp 12, i.e. statically. The storing of one or more local encryption keys EKey in a lamp 12, and/or in a driver 11 (operating unit) of a lamp 12 may be carried out as early as the production stage.

In particular, the transfer of the local encryption key EKey may be performed together with the programming of a luminaire ID in the form of the identification data ID. On the basis of the identification data ID, the key assignment may also be performed during the initial installation and localization of a lamp 12 at a particular location.

During the operation of a lamp 12 in a lighting system 100, the encryption key EKey may also be transferred dynamically. During operation, new encryption keys EKey may be installed in the driver 11 of the lamp 12. The installation may take place manually via a wired or wireless interface.

An existing network for lighting control is also particularly suitable for this purpose, because only small amounts of data are usually necessary and it is not a publicly accessible network. This network for lighting control is accessible via a building or lighting management system 21 with the appropriate authorization. For example, the server unit 20 may have access to the building or lighting management system 21 as a key server.

Also, radio-based transmitting and receiving units, which are connected to the driver 11, for example the beacon 16, which in this case is expediently designed for bi-directional radio transmissions, may be used for the installation of the encryption key EKey. Suitable devices here are beacons, which are connected to the lamp driver 11. These may also be used as receivers for data and therefore may also be used as a data path for the key distribution. The transmitting/receiving units in the form of the bi-directionally operating beacons 16 may form a wireless network (mesh) with each other, so that a gateway 22 is provided at only one access point of this wireless network, at which the encryption keys EKey may be imported.

Figure 5:
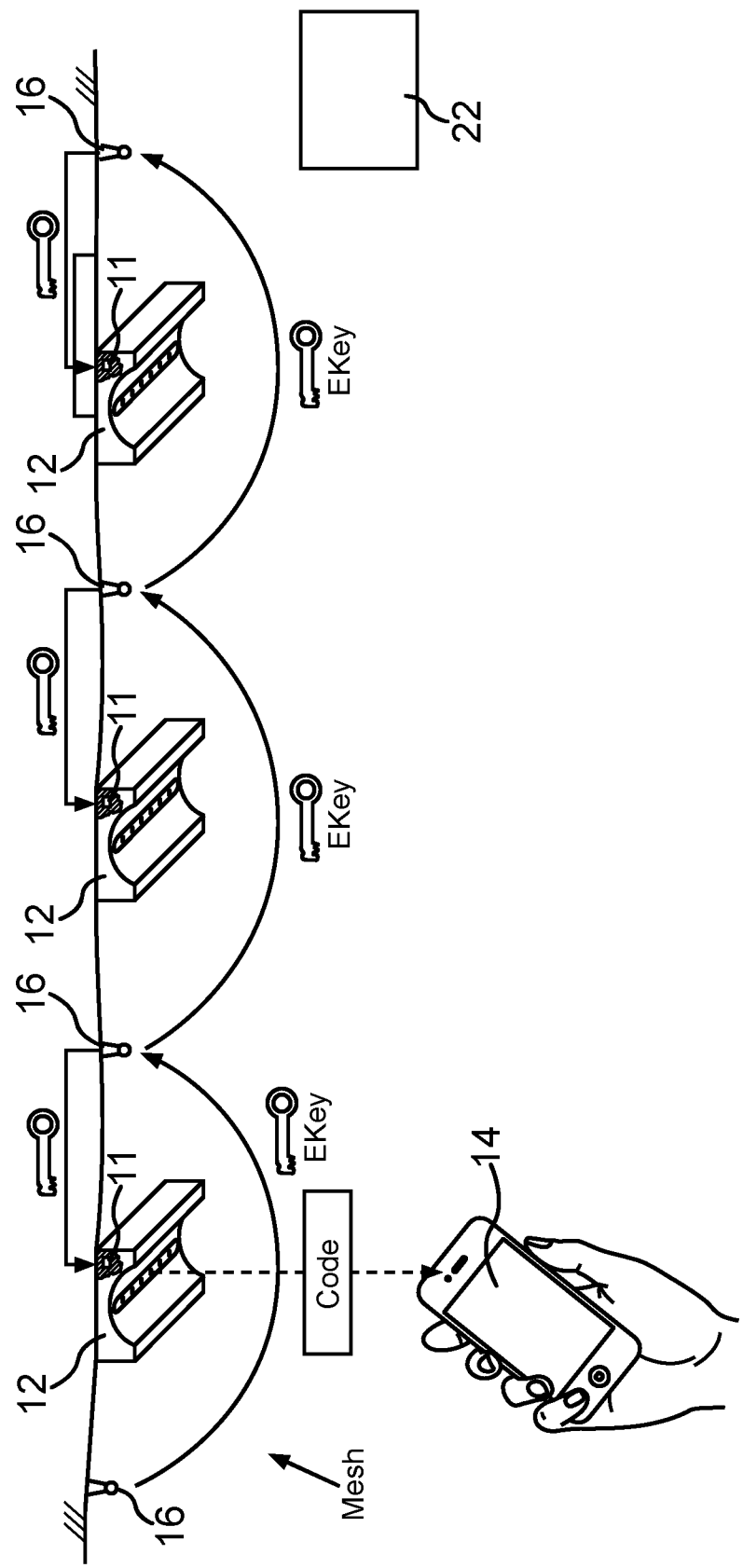

FIG. 5 shows a plurality of lamps 12 and a plurality of beacons 16, which form a wireless communication network. Such a network is designated as a mesh network Mesh. Access to this wireless communication network is provided by the gateway 22. The distribution of the decryption keys DKey to the various lamps 12 is performed in accordance with the meshing of the network from a beacon 16 to a following beacon 16 in the meshed network.

The encryption keys EKey may be transferred from a server unit 20 to the local gateway 22, or via the mobile terminal 14 to the gateway 22.

It may also be provided to transmit the encryption key EKey into a transmitting/receiving unit, for example into a bidirectionally operable beacon 16. Such transmitting/receiving units may also emit static identification data ID, which is not protected. In order to protect the identification data ID also in these transmitting/receiving units, the same method may be used for key distribution. In this case, the difference is that the decryption key DKey is not transferred to the lamp 12, but used directly by the transmitting/receiving units (beacon 16).

If no central encryption key EKey, which is uniformly valid for all lamps 12 and/or transmitting/receiving-units, is to be used but individual encryption keys EKey are to be distributed for each lamp 12/transmitting/receiving unit instead, then to address the decryption keys DKey during the distribution, the keys may be assigned individually, as shown in FIG. 2. In this case it is important to send the correct encryption key EKey to the intended lamp 12 and/or to the transmitting/receiving units (which in fact are considered as part of the lighting device with which they are in direct communication). This may be effected via a routing table, where all lamps 12 or transmitting/receiving units are locally mapped. This routing table records all the possible communication paths, via which an encryption key EKey may be sent to the correct position. The synchronization of the key selection and sequence may be achieved by a synchronization process, which requires a uniform time base on both sides, and which has the disadvantage that both components (transmitter and receiver) require a synchronous timer, which implies considerable cost.

Figure 6:
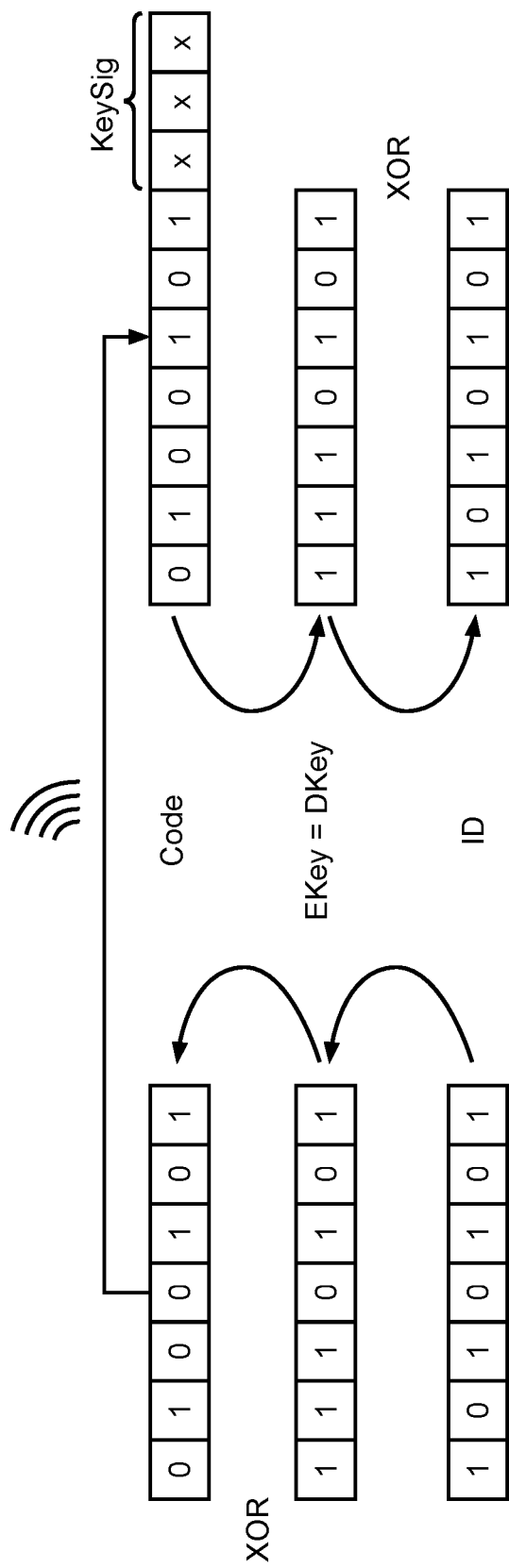

The synchronization of the keys may be advantageously performed via the data stream of the encrypted message Code itself. For this purpose, in addition to the actual encrypted identification data ID, further signaling bits x are used in a signaling bit string KeySig of the encrypted message Code, as shown in FIG. 6. These signaling bits x may be used to communicate to the receiver which of the respective decryption keys DKey[1 . . . m] should be used for the decryption.

As shown in FIG. 6, a luminaire ID with the binary value 1010101 may be coded by an encryption key EKey with the binary value 1110000 by means of an XOR operation to produce the binary value 0100101. The coded value is also appended with a signaling bit string KeySig consisting of three signaling bits x, by means of which the receiver may identify which key it must use to decrypt the message. In the example shown a form of symmetric encryption is used, in which the encryption key EKey is identical to the decryption key DKey. By the bitwise application of an XOR operator to the message Code and the decryption key DKey, the original luminaire ID L-ID is obtained again.

Figure 7:
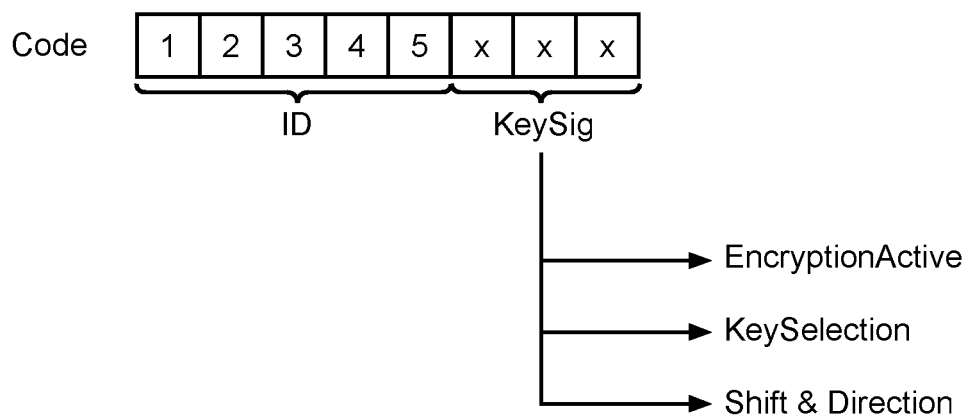

FIG. 7 shows an example of the information that may be supplied by means of a signaling bit string KeySig to a receiver of the encrypted message Code. For example, the bit string may be used to indicate that an encryption is active (EncryptionActive), to reference a key underlying the current encryption from a pool of available keys (KeySelection), and to indicate a possible shift in the respective output key by a bitwise rotation in a specifiable number bits with a specifiable direction (Shift&Direction).

Figure 8:
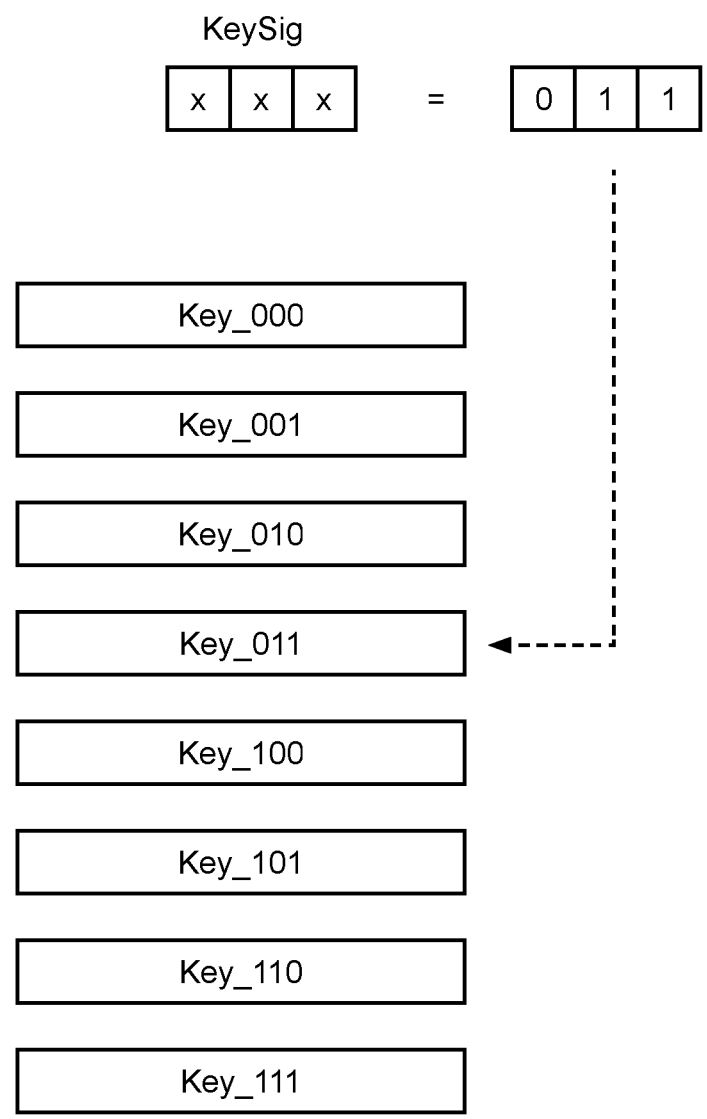

FIG. 8 shows the facility for selecting the respective key from a pool of specified keys Key_000, Key_001, Key_010, Key_011 . . . Key_111 as a function of the signaling bit string KeySig. For a number N=3 of signaling bits x, therefore, $2^N=8$ possible keys are obtained.

Furthermore, the unique encryption key EKey may be generated in the local lamp 12, in particular in its driver 11, or in the respective local transmitting/receiving unit, represented in FIG. 5 by the beacons 16. If the encryption keys EKey[loc] are generated locally and these individually generated local encryption keys EKey[loc] are transmitted to the server unit 20 to manage them, the result is a significantly lower degree of complexity, since there is only one receiver and therefore no routing table needs to be generated or maintained. Each lamp 12 issues its own individually generated encryption key EKey[loc] together with the fixed identification data ID, which has been assigned to the lamp 12. Instead of the identification data ID, the exact local position of the lamp 12 where this key will be used may also be transmitted. A table is thus set up on the server unit 20, which contains the local keys and the individual identification data items ID and/or the position of the lamp 12/the beacon 16 (transmitting/receiving unit).

In order to even better protect the lighting system 100, the key generation may be triggered by the server unit 20. To this end a signal is sent to all beacons 16/lamps 12/transmitting/receiving units, as shown in FIG. 5. Ideally, this process is performed at times in which the lighting system 100 is not in use, and/or when there is little or no data traffic, for example at night. Therefore on the server unit 20 side, the encryption key EKey[temp] changes only once, while the lamps 12 or the beacons 16 then each locally generate one independent encryption key EKey[temp,loc] from this.

To distribute the volume of data produced during the return of the new encryption keys EKey, an individual time offset may be defined. In order not to have to communicate an individual time offset between the signal for the new key generation and sending the new encryption key EKey to the server unit 20 to every unit, i.e. the components integrated in the meshed network Mesh in the form of the lamp 12, beacon 16 and other transmitting/receiving units such as WLAN router 18, each of which has its own key generator, a process which implies a significant addressing and communication effort, this time offset may be programmed in during the production of the respective devices.

Alternatively or additionally, a fixed stored individual identification number or manufacturer number may be used as an offset/time offset. Not all subscribers to the network therefore change the encryption EKey at the same time, but switch this time delay EKey to valid with a time offset and then transfer it. The generation and activation of the key may thus be carried out separately.

The number N of signaling bits x determines the number of possible keys $m=2^N$. For N=8, this results in a selection of m=256 different keys, or for N=3, as shown in FIG. 8, m=8. In order to further increase the number of keys but without causing the number of signaling bits x to increase or further reducing the address space for the actual identification data ID, whole groups of keys may also be used, which are addressed via the signaling bits x. Using 256 groups each with 100 keys therefore results in 25,600 different keys. For a transmission rate of 100 milliseconds per encrypted identification data ID, a key would therefore repeat every 2,560 seconds or after approximately 42 minutes, so that reading would take the same amount of time.

In order to further increase the protection of the lighting system 100, a local individual randomly controlled key generation may also be performed instead of a central key generation request. This random control may be triggered via internal counters, which are started with random values. The time base may be selected so that a key generation may be carried out within hours, days or weeks. As soon as a new local encryption key EKey[n+1,loc] is generated, this is sent to the server unit 20.

As long as the server unit 20 has not yet received and assigned the new individual encryption key EKey[n,loc], in other words an individual local second key, it is advantageous if the old encryption key EKey[n−1,loc], in other words the previous first key, is temporarily retained, to ensure that the service is maintained without interruption. On the server unit 20 the old and new encryption key EKey[n−1,loc], EKey[n,loc] are known and may therefore be used for example to answer both an old and a new request for the identification data ID.

For the detection and localization of unauthorized service requests or position requests, the "old" encryption keys EKey[n−1,loc], EKey[n−2,loc], EKey [n−2,loc], etc. may continue to be stored on the server unit 20 so that a key history is produced. If a request is then made for identification data ID which was encrypted with an out-of-date encryption key EKey[n−2,loc], this is an indication that an unauthenticated access is being attempted. This allows further measures to be derived, such as a selective deactivation of a possibly outdated app, which does not yet support encryption, on the mobile terminal 14, or offering a new app version. Likewise, a localization of the mobile terminal 14 may be performed, which carries out the unauthenticated requests.

Alternatively or in addition, the signaling bits x may be distributed locally via another channel, for example, via a beacon 16 connected to the respective driver 11 of a lamp 12, or via a mobile radio channel between the server unit 20 and/or the mobile terminal 14 and the lamp 12.

The effort required to be able to access such a lighting system 100 without knowledge of the decryption keys DKey may be further increased if the validity of decryption keys DKey has a local dependency, that is, if a specific set of decryption keys DKey[loc] is only valid for parts of the lighting system 100 within a specific area. Thus, using a beacon 16 a rough localization may be performed. From this it is possible to derive which decryption key DKey[loc] is valid in this area.

Figure 9:
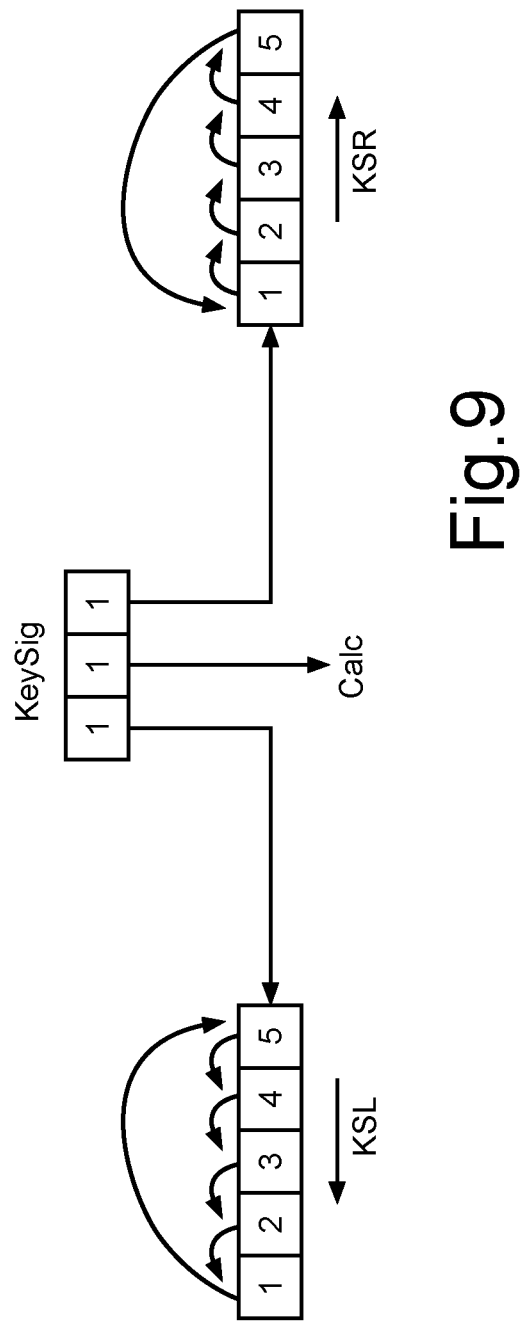

To restrict the access options to a static luminaire ID by static encryption keys EKey—in particular in the case of a symmetrical encryption—, in addition to increasing the number N of the keys and rotation of these keys, the key itself may also be rotated, as shown in FIG. 9. In this situation the length of the key and the number and type of key shifts determine the additional encryption space. Under the assumption that the length of the identification data ID is 10 bits and the length of the key is also 10 bits, the key repeats again after ten steps in a shift register. For the above example, this means that each of the 100 keys may be used 10 times before it repeats itself. This increases the time until a key is repeated to 420 minutes.

By extending the key length from 10 bits to 1024 bits the duration also increases linearly by a factor of 1,224 (1,024*420 minutes=7,168 hours=approximately 300 days).

Figure 11:
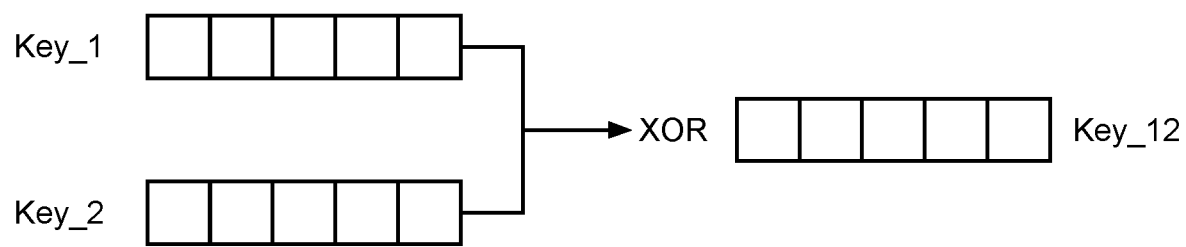

New keys may be generated from existing keys by combination. If a key Key_1 is linked to another key Key_2 via a computational rule, for example, an XOR operation, then a new key Key_12 will be produced as shown in FIG. 11. With 100 keys this means that 4,950 new keys may be generated (N*(N−1)/2) with N=the number of keys). In this further developed example, this would extend a time until repetition of the same message Code which contains the encrypted identification data ID by approximately 50-fold, thus to 15,000 days or 41 years.

These methods for encrypting a luminaire ID as identification data ID may also be extended to data which also could be transmitted via light, and may be transferred securely in accordance with this method.

FIG. 9 shows possible operations that may be applied to an existing key. For example, the left bit may indicate that a key must be shifted to the left (key shift left, KSL) and/or the right bit in the signaling bit string KeySig may indicate that the key should be shifted to the right (key shift right, KSR). In fact, at the bit level the term move/shift means the rotation of the bits in a shift register, in which case a bit shifted out of the shift register is re-inserted at the opposite end. The middle bit may be used to indicate that a predefined algorithm Calc is to be performed to change the key and/or the parameters for applying a computation rule.

Figure 10:
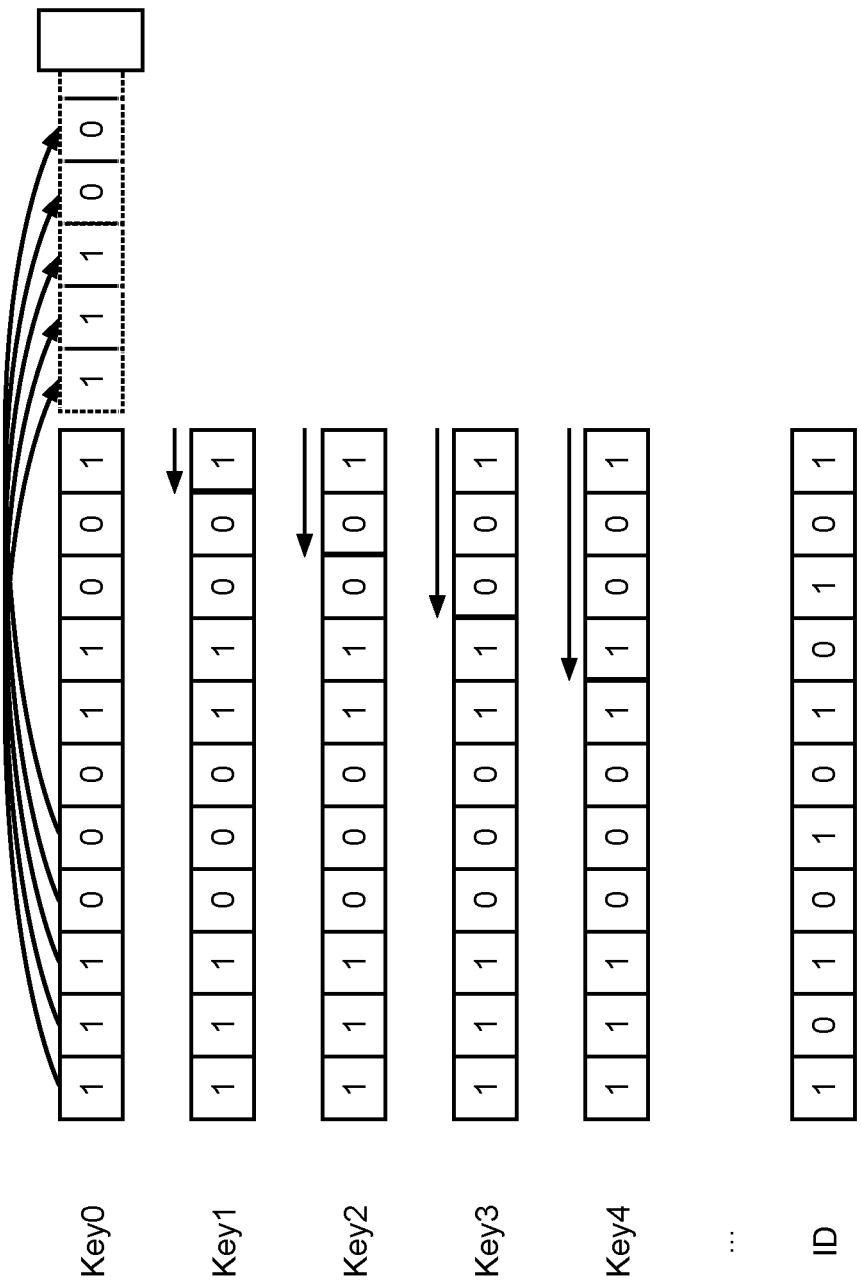

FIG. 10 shows how, on the basis of an initial key Key0 a first key Key1, a second key Key2, a third key Key3, a fourth key Key4 and so on, may be generated by bitwise rotation of the key. The application of the first key Key1 to the identification data ID therefore results in a first message Code_1, an application of the second key Key2 to the identification data ID accordingly produces a second message Code_2, and so on in the same way.

Finally, FIG. 11 shows how the new key Key_12 may be generated from the key Key_1 and the key Key_2 by bitwise application of an XOR operator.

The exemplary embodiments are used only for explaining the invention, and do not limit it. Thus, in particular, the assignment of the data storage unit, the encryption unit and the transmitting unit within the lighting device may be designed in any desired way, without departing from the idea of the invention.

Thus, in the above it has been shown how a key transport may be designed for the encryption of location-bound information to ensure a secure communication.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A lighting device for communication with a mobile terminal, comprising:
a lighting element, and
an electronic operating device for operating the lighting element,
a data storage unit, in which a first key is stored in a memory area reserved therefor,
wherein the first key comprises a light-ID configured to be modulated onto a luminous flux of the lighting element,
an encryption unit configured to read out the first key from the reserved memory area and, in accordance with a specifiable encryption operation, to convert measurement value data and/or identification data intended for transfer to the mobile terminal into a message encrypted by the first key, and
a transmitting unit configured to transmit the encrypted message via modulation on the luminous flux of the lighting element to the mobile terminal.

2. The lighting device as claimed in claim 1, wherein the lighting device has an interface, configured to access the reserved memory area in a write mode.

3. The lighting device as claimed in claim 2, wherein the interface is part of the electronic operating unit, wherein the electronic operating unit is configured, in a normal operating mode of the lighting device, to operate the lighting element as a function of a control signal supplied at the interface.

4. The lighting device as claimed in claim 1, wherein the lighting device has a transmitting/receiving unit, in particular a radio beacon, wherein the transmitting/receiving unit is configured to access the reserved memory area in a write mode.

5. The lighting device as claimed in claim 4, the transmitting unit is formed by the transmitting/receiving unit, wherein the data storage unit and the encryption unit are implemented on components of the transmitting/receiving unit.

6. The lighting device as claimed in claim 1, wherein the transmitting unit comprises the lighting element configured to transmit the message by a light-based communication, wherein the data storage unit and the encryption unit are implemented on components of the electronic operating unit.

7. The lighting device as claimed in claim 1 wherein the reserved memory area comprises a plurality of first keys, wherein the encryption unit is configured to use one of the plurality of first keys for the encryption operation, depending on a key activation signal that is supplied to the lighting device.

8. A lighting system with at least one lighting device, the lighting device comprising:
a lighting element, and
an electronic operating device for operating the lighting element,
a data storage unit, in which a first key is stored in a memory area reserved therefor,
wherein the first key comprises a light-ID configured to be modulated onto a luminous flux of the lighting element,
an encryption unit configured to read out the first key from the reserved memory area and, in accordance with a specifiable encryption operation, to convert measurement value data and/or identification data intended for transfer to the mobile terminal into a message encrypted by the first key, and
a transmitting unit configured to transmit the encrypted message via modulation on the luminous flux of the lighting element to the mobile terminal;
wherein the lighting system further comprises a central key server in a communication link to the at least one lighting device.

9. The lighting system as claimed in claim 8, wherein the key server is configured to transmit a key generation signal to the at least one lighting device via the communication link, wherein the at least one lighting device is configured to generate an individual local second key depending on the key generation signal received via the communication link.

10. The lighting system as claimed in claim 9, wherein the at least one lighting device is configured, at the time when the individual local second key is generated, to start a timer with an individually specifiable expiration period, and after the expiry of the timer to register the second key on the key server via the communication connection, as a new first key used for the encryption operation.

11. The lighting system as claimed in claim 8, wherein the at least one lighting device is configured to generate an individual local second key depending on a lighting-device internal timer.

12. The lighting system as claimed in claim 8, wherein the at least one lighting device comprises a first and a second lighting device, wherein the central key server is configured to generate a first individual key and send it via the communication link in such a way that the first individual key is written into the memory area of the first lighting device reserved for the first key, and to generate a second individual key and send it via the communication link in such a way that the second individual key is written into the memory area of the second lighting device reserved for the first key, wherein the second individual key is different from the first individual key.

13. The lighting system as claimed in claim 10, wherein the at least one lighting device comprises a plurality of lighting devices, wherein the respective transmitting units of the plurality of lighting devices are configured as transmitting/receiving units for bidirectional communication, and wherein the plurality of lighting devices is configured to jointly operate a meshed network using the respective transmitting/receiving units, to allow communication of the individual lighting devices of the plurality of lighting devices among one another.

14. A method for operating a lighting device by communication with a mobile terminal, comprising:
   storing a first key in a memory area of the lighting device reserved therefor, wherein the first key comprises a light-ID configured to be modulated onto a luminous flux of the lighting element,
   reading out the first key from the reserved memory area,
   in accordance with a specifiable encryption operation, converting measurement value data and/or identification data, for transmission to the mobile terminal, into a message encrypted with the first key, and
   transmitting the encrypted message via modulation on the luminous flux of the lighting element to the mobile terminal by a transmission unit of the lighting device.

15. The method as claimed in claim 14, further comprising:
   use of one of a plurality of first keys, wherein the plurality of keys comprise the reserved memory area, for the encryption operation as a function of a key activation signal supplied to the lighting device.

16. The method as claimed in claim 14, further comprising:
   transmitting a key generation signal over a communication link to the lighting device using a key server, and
   depending on the key generation signal received via the communication link, generating a local individual key to be used for the encryption operation by the lighting device.

17. The lighting device as claimed in claim 1, wherein the lighting device is a lamp.

* * * * *